(12) United States Patent
Lee

(10) Patent No.: US 7,042,542 B2
(45) Date of Patent: May 9, 2006

(54) IN-PLANE SWITCHING MODE LIQUID CRYSTAL DISPLAY DEVICE AND METHOD FOR MANUFACTURING THE SAME

(75) Inventor: Joun Ho Lee, Taegu-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 101 days.

(21) Appl. No.: 09/891,531

(22) Filed: Jun. 27, 2001

(65) Prior Publication Data

US 2002/0044244 A1  Apr. 18, 2002

(30) Foreign Application Priority Data

Aug. 30, 2000  (KR) ............... 2000-50772

(51) Int. Cl.
  *G02F 1/1343*  (2006.01)
(52) U.S. Cl. ..................... 349/141
(58) Field of Classification Search ............. 349/141, 349/148
  See application file for complete search history.

(56) References Cited

U.S. PATENT DOCUMENTS

| | | | |
|---|---|---|---|
| 5,745,207 A | 4/1998 | Asada et al. ............... 349/141 |
| 5,905,556 A | 5/1999 | Suzuki et al. ............. 349/141 |
| 5,946,066 A | 8/1999 | Lee et al. .................. 349/141 |
| 6,124,851 A * | 9/2000 | Jacobson ................... 345/206 |
| 6,208,399 B1 * | 3/2001 | Ohta et al. ................ 349/139 |
| 6,452,656 B1 * | 9/2002 | Niwano et al. ........... 349/141 |
| 2001/0040648 A1 * | 11/2001 | Ono et al. ................. 349/43 |
| 2002/0067455 A1 * | 6/2002 | Komatsu ................... 349/141 |
| 2002/0186338 A1 * | 12/2002 | Niwano et al. ........... 349/141 |

FOREIGN PATENT DOCUMENTS

| | | |
|---|---|---|
| JP | 9-105908 | 4/1997 |
| JP | 10-301505 | 11/1998 |
| JP | 2000-162602 | 6/2000 |
| JP | 2000-338462 | 12/2000 |
| KR | 10-250796 | 1/2000 |

OTHER PUBLICATIONS

Penguin Dictionary of Electronics, 3rd ed., Penguin Books: London, 1998, p. 167.*

* cited by examiner

*Primary Examiner*—Stephen W. Smoot
(74) *Attorney, Agent, or Firm*—McKenna Long & Aldridge LLP

(57) ABSTRACT

An in-plane switching mode LCD device and a method for manufacturing the same are disclosed. The in-plane switching mode LCD device includes first and second substrates, data and gate lines on the first substrate to define a plurality of pixel regions, common and data electrodes on the first substrate, a transparent conductive film electrically connected with the common electrode, and a liquid crystal layer between the first and second substrates. Thus, response time of a liquid crystal and transmittivity are improved by reducing the distance between the common electrode and the data electrode. Also, a dynamic range margin of a drive IC is obtained and at the same time luminance is improved.

21 Claims, 5 Drawing Sheets

IN-PLANE SWITCHING MODE LIQUID CRYSTAL DISPLAY DEVICE AND METHOD FOR MANUFACTURING THE SAME

This application claims the benefit of Korean Patent Application No. 2000-50772, filed on Aug. 30, 2000, which is hereby incorporated by reference for all purposes as if fully set forth herein.

BACKGROUND OF THE INVENTION

1. Field of the Invention

The present invention relates to a display device, and more particularly, to an in-plane switching mode liquid crystal display (LCD) device and a method for manufacturing the same, in which a liquid crystal molecule is controlled by an electric field parallel to a substrate.

2. Discussion of the Related Art

An ultra thin sized flat panel display having a display screen with a thickness of several centimeters, especially LCD devices, are widely used in monitors for notebook computers, spacecraft, and aircraft.

Such an LCD device has low power consumption and is easy to transport. In this respect, LCD devices are receiving much attention as an advanced display device that can substitute for a cathode ray tube (CRT).

The LCD device includes a thin film transistor (TFT) substrate, a color filter substrate, and a liquid crystal layer sealed between the TFT substrate and the color filter substrate. The LCD is a non-light-emitting device that can obtain image effect based on electric optical characteristics of the liquid crystal layer.

In other words, a TFT array and a pixel electrode are formed on the TFT substrate, while a black matrix pattern, a color filter layer, and a common electrode are formed on the color filter substrate. The TFT substrate and the color filter substrate are bonded to each other by a sealant such as epoxy resin.

A driving circuit is connected with the TFT substrate using a tape carrier package (TCP) as a medium. The driving circuit generates various control signals and signal voltages to display images.

Development and application of TFT-LCDs have accelerated in accordance with an increase in the dimensions and increase of the resolution. To increase the productivity and ensure the low cost, many efforts have been continued in view of simplified process steps and improvement of yield. However, in spite of the trend towards LCDs with large area, a problem arises in that contrast ratio varies depending on viewing angle.

To solve this problem, various LCDs, such as a twist nematic LCD provided with a retardation film and a multi-domain LCD, have been proposed. However, a problem still arises in that contrast ratio and color are varied depending on a viewing angle.

To ensure a wide-viewing angle, an in-plane switching mode LCD device that controls alignment of a liquid crystal by an electric field parallel to a substrate has been proposed.

FIG. 1 is a plan view illustrating a related art in-plane switching mode LCD device, and FIG. 2 is a sectional view taken along line I–I' of FIG. 1.

As shown in FIG. 1, gate lines 11 are arranged to cross data lines 13 so that a plurality of pixel regions are defined. A common electrode 15 and a data electrode 17 are formed within the pixel region in parallel. For reference, FIG. 1 shows a unit pixel.

The common electrode 15 is of metal, while the data electrode 17 is of metal, or indium tin oxide (ITO), which is a transparent conductive material.

The common electrode 15 and the gate line 11 are formed by the same process while the data line 13 and the data electrode 17 are formed by the same process.

In the related art in-plane switching mode LCD device, as shown in FIG. 2, the common electrodes 15 are formed on a first substrate 10, and a gate insulating film 16 is formed on the first substrate 10 including the common electrodes 15. The data electrode 17 is formed on the gate insulating film 16, and a passivation film 18 is formed on an entire surface including the data electrode 17.

Meanwhile, a light-shielding layer 21 is formed on a second substrate 10a, which opposes the first substrate 10, so as to prevent light from being leaked out to the data line 13, the gate line 11 and a TFT formed on the first substrate 10. A color filter layer 23 is also formed on the second substrate 10a to display color. A liquid crystal layer 25 is formed between the first substrate 10 and the second substrate 10a.

In the related art in-plane switching mode LCD device, as shown in FIG. 2, an in-plane electric field parallel to the substrates is generated between the data electrode 17 and the common electrode 15. The in-plane electric field is determined considering a dielectric constant 1 of the gate insulating film 16, a dielectric constant 2 of the passivation film 18, and a dielectric constant 3 of the liquid crystal layer 25. At this time, a distance L1 is maintained between the common electrode 15 and the data electrode 17.

In the aforementioned related art in-plane switching mode LCD device, if a driving voltage is applied from an external driving circuit (not shown), the in-plane electric field parallel to the substrates is generated between the data electrode 17 and the common electrode 15. A liquid crystal molecule aligned within the liquid crystal layer 25 by the in-plane electric field is rotated along the in-plane electric field in parallel with the substrates. As a result, an amount of light that passes through the liquid crystal layer 25 is controlled and gray is displayed in a state when the liquid crystal molecule is parallel to the substrate. For this reason, the difference of light transmittivity depending on viewing angle is reduced.

However, the related art in-plane switching mode LCD device has several problems.

Since the distance between the common electrode and the data electrode is large, a threshold voltage Vth increases. For this reason, response time and a dynamic range of a drive integrated circuit (IC) increase. In other words, since the distance between the common electrode and the data electrode is large, a cyano (CN) based liquid crystal having high viscosity and dielectric constant is required to improve response time. Since the CN based liquid crystal has high polarity, it is not better than a fluorine (F) based liquid crystal in view of contamination and reliability. To improve reliability, the F based liquid crystal may be used. However, in the related art structure, it is not desirable that the F based liquid crystal is used. This is because the F based liquid crystal can improve reliability, but is less effective than the CN based liquid crystal in view of the dynamic range of the drive IC and response time.

SUMMARY OF THE INVENTION

Accordingly, the present invention is directed to an in-plane switching mode LCD device and method for manufacturing the same that substantially obviate one or more of the problems due to limitations and disadvantages of the related art.

An object of the present invention is to provide an in-plane switching mode LCD device and a method for manufacturing the same in which response time of a liquid crystal and transmittivity are improved and at the same time a dynamic range margin of a drive IC is obtained.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an in-plane switching mode LCD device according to the present invention includes first and second substrates, data and gate lines on the first substrate to define a plurality of pixel regions, common and data electrodes on the first substrate, a transparent conductive film electrically connected with the common electrode, and a liquid crystal layer between the first and second substrates.

To further achieve these and other advantages and in accordance with the purpose of the present invention, a method for manufacturing an in-plane switching mode LCD device according to the present invention includes the steps of providing first and second substrates, forming a plurality of gate lines and common electrodes on the first substrate, forming a gate insulating film on the common electrodes, forming a plurality of data lines and data electrodes on the gate insulating film, forming a transparent conductive film electrically connected with the common electrodes, and forming a liquid crystal layer between the first and second substrates.

In the preferred embodiment of the present invention, a transparent conductive material overlaps an upper portion of the common electrode and is electrically connected with the common electrode so that the distance between the common electrode and the data electrode becomes narrow. This improves response time without affecting transmittivity and reduces the dynamic range of the driver IC. In addition, because the distance between the electrodes is narrow, an F based liquid crystal is more stable than a CN based liquid crystal, thereby improving reliability. The F based liquid crystal has response time poorer than that of the CN based liquid crystal. However, this can sufficiently be compensated by reducing the distance between the electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
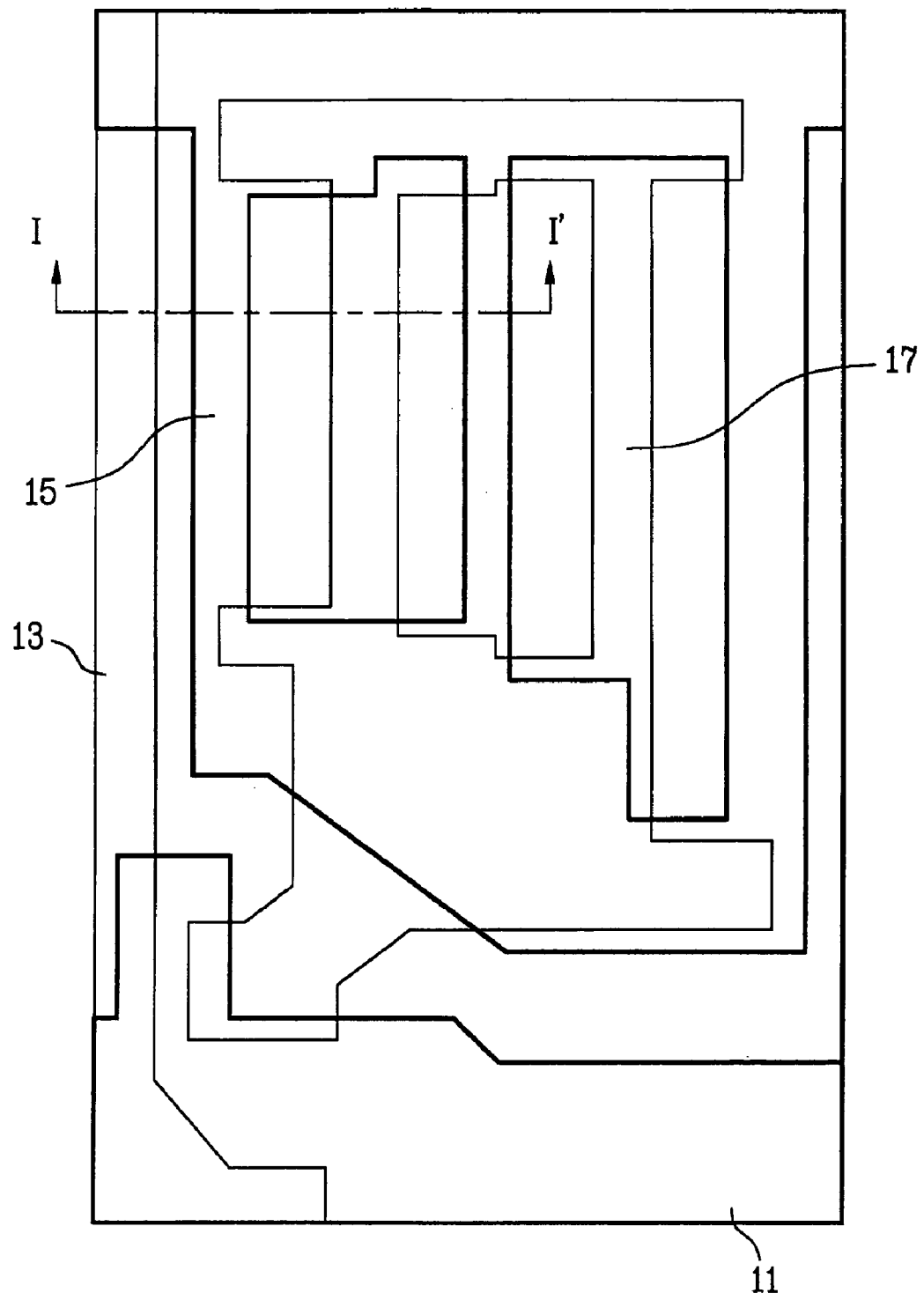
FIG. 1 is a plan view illustrating a related art in-plane switching mode LCD device.
Figure 2:
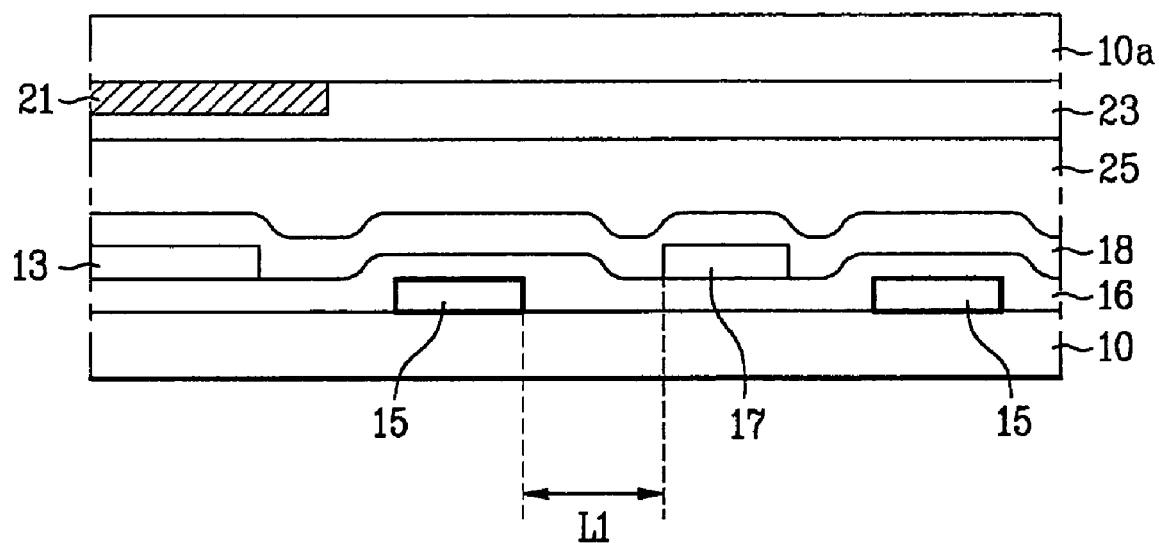
FIG. 2 is a sectional view taken along line I–I' of FIG. 1.
Figure 3:
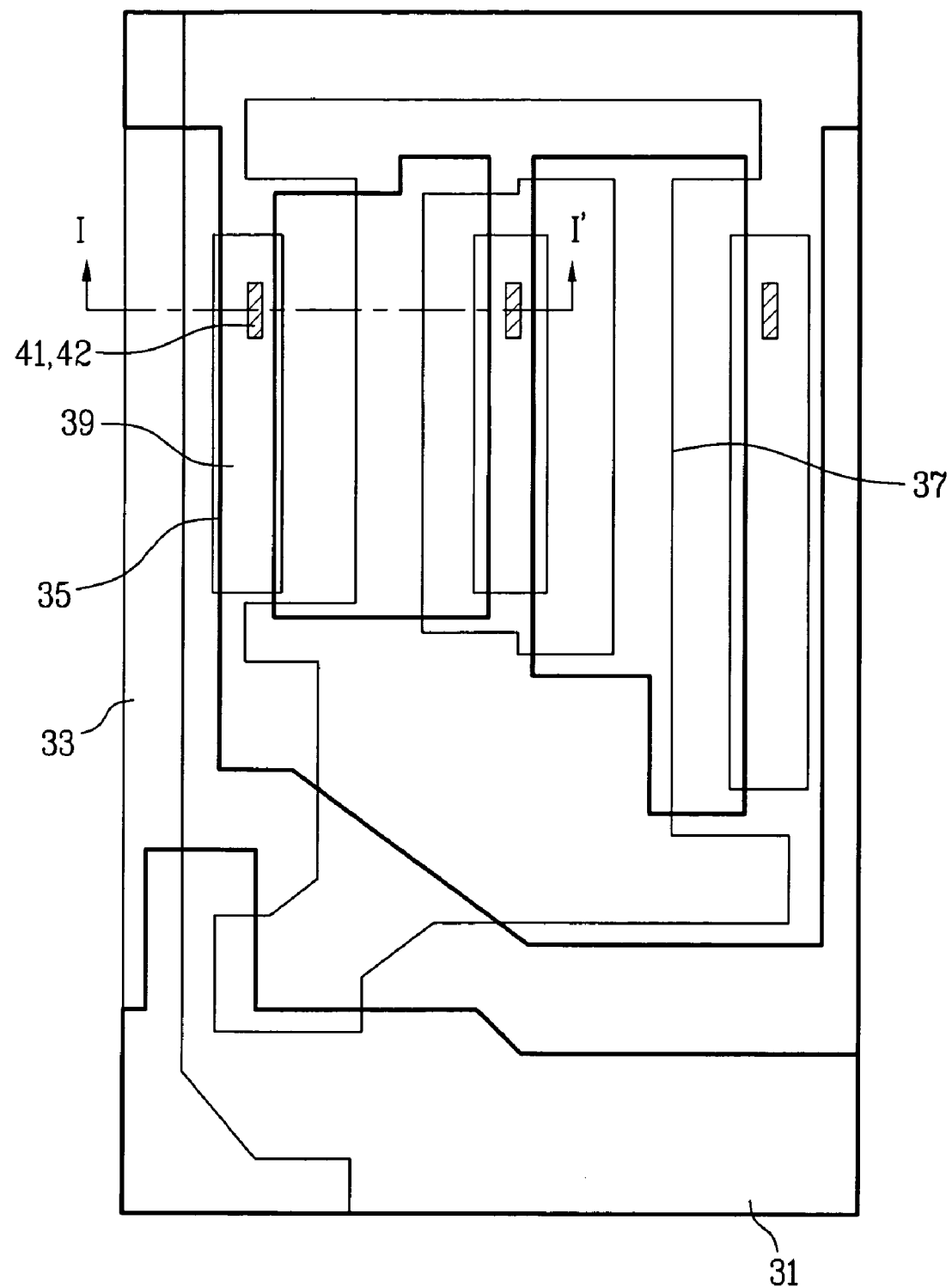
FIG. 3 is a plan view illustrating an in-plane switching mode LCD device according to the present invention.

FIG. 3 is a plan view illustrating an in-plane switching mode LCD device according to the present invention.

Referring to FIG. 3, an in-plane switching mode LCD device according to the present invention includes a gate line 31 arranged to cross a data line 33, a common electrode 35 formed within a pixel region in parallel with the data line 33, a data electrode 37 formed within the pixel region in parallel with the data line 33, and a transparent conductive film 39 electrically connected with the common electrode 35 over the common electrode 35 to extend to the data electrode 37. The pixel region is defined by the gate and data lines 31 and 33.

The transparent conductive film 39 and the common electrode 35 below the transparent conductive film 39 are electrically connected with each other through a contact hole 41 or by a laser welding 42. Since the transparent conductive film 39 has a pattern extended to the data electrode 37, the distance between the common electrode 35 and the data electrode 37 is narrowed by as much as the portion of the transparent conductive film 39 extended to the data electrode 37.

Figure 4:
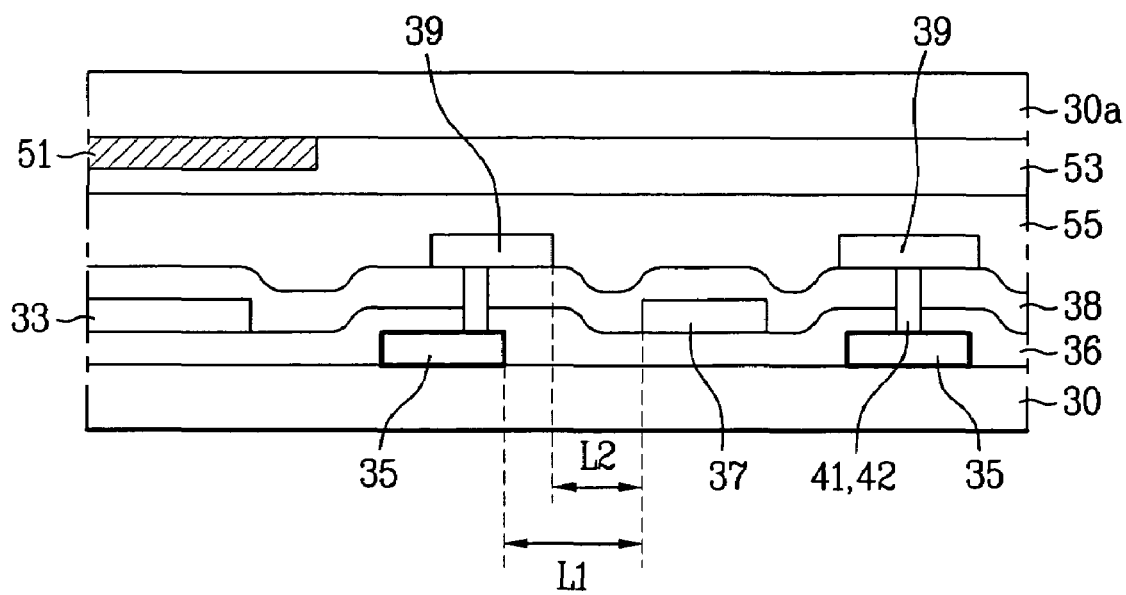
FIG. 4 is a sectional view taken along line II–II' of FIG. 3.

In the aforementioned in-plane switching mode LCD device of the present invention, as shown in FIG. 4, a plurality of the common electrodes 35 are formed on a first substrate 30, and a gate insulating film 36 is formed on the first substrate 30 including the common electrodes 35. The data electrode 37 is formed on the gate insulating film 36 between adjacent common electrodes 35. A passivation film 38 is formed on the gate insulating film 36 including the data electrode 37.

The transparent conductive film 39 is formed on the passivation film 38 over the respective common electrodes 35 and extends toward adjacent data electrode 37. The transparent conductive film 39 and the common electrode 35 below the transparent conductive film 39 have an electrically connected structure, for example, through contact hole 41 or by laser welding 42.

Meanwhile, a light-shielding layer 51 and a color filter layer 53 are formed on a second substrate 30a. The light-shielding layer 51 prevents light from being leaked out to the data line 33 and a TFT (not shown) formed on the first substrate 30. The color filter layer 53 displays a color. A liquid crystal layer 55 is formed between the first and second substrates 30 and 30a.

The gate line 31 and the common electrode 35 are formed of metal by the same process. The data line 33 and the data electrode 37 are also formed by the same process and is of metal or ITO.

An alignment film may additionally be formed on the first and second substrates 30 and 30a. After polyamide, polyimide based compound, polyvinylalcohol (PVA), or polyamic acid is deposited on the first and second substrates 30 and 30a, rubbing may be performed to determine alignment direction. After a photo-alignment material such as polysiloxanecinnamate, polyvinylcinnamate, and cellulosecinnamate is deposited on the first and second substrates 30 and 30a, light may be irradiated to determine alignment direction and a pretilt angle. At this time, polarized light, non-polarized light, un-polarized light or partially polarized light is irradiated one or more time. Preferably, ultraviolet rays are used.

In the aforementioned in-plane switching mode LCD device of the present invention, the transparent conductive film 39, which extends toward the data electrode 37, is electrically connected with the common electrode 35. Accordingly, the distance L2 between the data electrode 37 and the common electrode 35 is narrower than the distance L1 between them in the related art.

Furthermore, since in-plane electric field occurs between the transparent conductive film 39 and the data electrode 37, a dielectric constant of the gate insulating film 36 need not be considered. Since the transparent conductive film 39 formed between the data line 33 and the data electrode 37 serves as a shielding layer, crosstalk between the data line 33 and the data electrode 37 can be prevented from occurring.

Moreover, by using the transparent conductive film, it is possible to eliminate the voltage drops across the passivation film 38 and gate insulating film 36 ordinarily experienced when the electric field is between the common electrode 35 and the data electrode 37. Therefore, in a region where electric field intensity is reduced by the gate insulating film 36 and the passivation film 38, electric field efficiency can be increased by the transparent conductive film 39. Accordingly, it is possible to reduce a threshold voltage Vth and a driving voltage.

A method for manufacturing the aforementioned in-plane switching mode LCD device according to the present invention will be described with reference to FIGS. 5A to 5E.

Figure 5A:
FIGS. 5A to 5E are sectional views illustrating a method for manufacturing an in-plane switching mode LCD device according to the present invention.

As shown in FIG. 5A, a metal layer such as Al, Cr, Ti and Al alloy is formed on the first substrate 30 by sputtering process and then selectively removed to form a plurality of the common electrodes 35, the gate line (not shown), and a gate electrode (not shown) of the TFT.

Figure 5B:
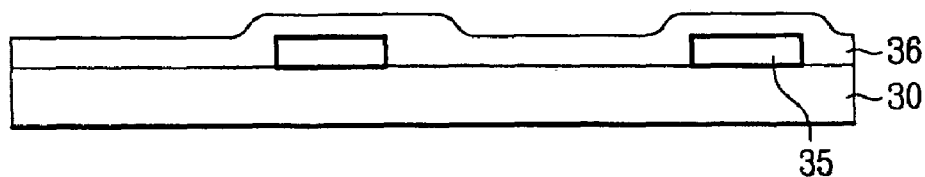

As shown in FIG. 5B, the gate insulating film 36 of $SiN_x$, $SiO_x$, or the like, is formed on an entire surface of the first substrate 30 including the common electrode 35 and the gate line by chemical vapor deposition (CVD).

Figure 5C:
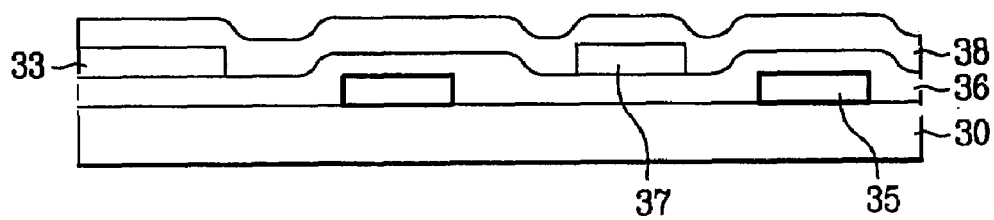

As shown in FIG. 5C, a metal such as Al, Cr, Ti, and Al alloy, or at transparent conductive material such as ITO is formed on the gate insulating film 36 by sputtering and then patterned by photolithography to form the data line 33 and the data electrode 37. The data line 33 crosses the gate line. The data electrode 37 is formed within the pixel region defined by the data line 33 and the gate line, in parallel with the data line 33 and is spaced apart from the common electrode 35.

Subsequently, the passivation film 38 of an inorganic material such as $SiN_x$ and $SiO_x$ or an organic material such as benzocyclobutene (BCB) or acryl is formed on the entire surface including the data line 33 and the data electrode 37.

Figure 5D:
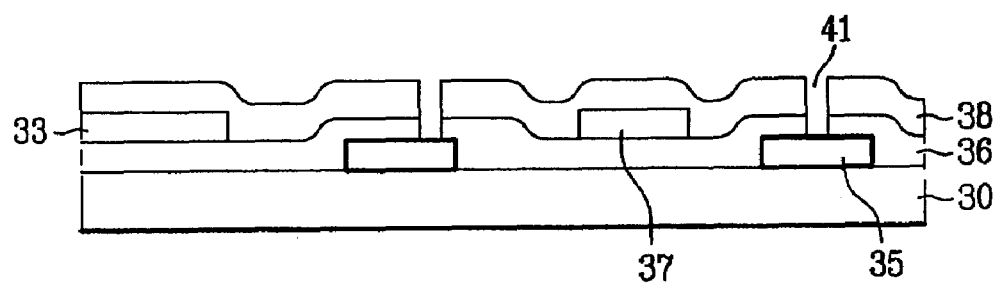
Figure 5E:
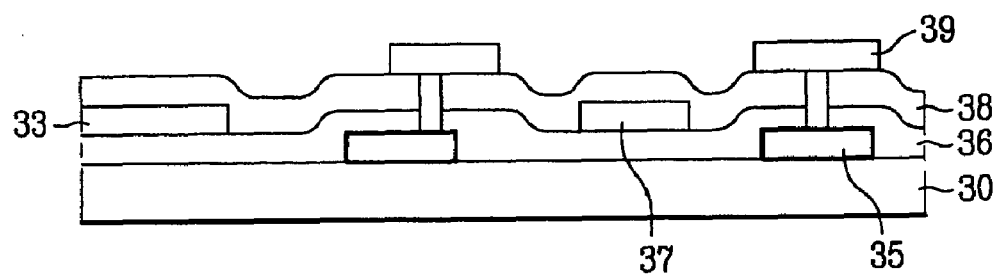

As shown in FIG. 5D, the passivation film 38 and the gate insulating film 36 are selectively removed to partially expose a surface of the common electrode 35 so that a contact hole 41 is formed. A transparent conductive material such as ITO is formed on the entire surface including the contact hole 41 and then patterned to form the transparent conductive film 39, as shown in FIG. 5E. The transparent conductive film 39 is connected with the common electrode 35 through the contact hole 41 and partially extends to the data electrode 37. At this time, the transparent conductive film 39 may electrically be connected with the common electrode 35 through a laser welding without forming the contact hole 41.

Afterwards, once the liquid crystal layer 55 is formed between the first substrate 30 and the second substrate 30a, on which the light-shielding layer and the color filter layer are formed, the process for manufacturing the in-plane switching mode LCD device according to the present invention is completed. At this time, the liquid crystal layer 55 may be formed of a CN or a superflourine material (SFM) based material.

As described above, the in-plane switching mode LCD device of the present invention has the following advantages.

Since the distance between effective electrodes becomes narrow using the transparent conductive film, it is possible to improve response time and a dynamic range of a drive IC. In addition, since the F (Fluorine) based liquid crystal material may be used instead of the cyano (CN) based liquid crystal material, it is possible to improve reliability. Moreover, since the transparent conductive film is formed between the data line and the data electrode to serve as a shielding layer, crosstalk between them can be prevented from occurring and transmittivity can be improved, thereby improving luminance.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode LCD device comprising:
   first and second substrates;
   data and gate lines on the first substrate to define a plurality of pixel regions;
   at least one data electrode on the first substrate;
   at least one common electrode on the first substrate;
   a transparent conductive film in a layer over the common electrode, the transparent conductive film electrically connected with the common electrode; and
   a liquid crystal layer between the first and second substrates, wherein the data electrode and the transparent conductive film generate an in-plane electric field substantially parallel to the first and second substrates for controlling an amount of light at the respective pixel region.

2. The device of claim 1, wherein the transparent conductive film includes indium tin oxide (ITO).

3. The device of claim 1, further comprising a gate insulating film on the common electrode.

4. The device of claim 1, further comprising a passivation film on the common electrode.

5. The device of claim 4, wherein the common electrode is electrically connected with the transparent conductive film through a contact hole in the passivation film.

6. The device of claim 1, wherein the common electrode is electrically connected with the transparent conductive film through a laser welding.

7. The device of claim 1, wherein the liquid crystal layer includes a cyano (CN) based liquid crystal.

8. The device of claim 1, wherein the liquid crystal layer includes a fluorine (F) based liquid crystal.

9. The device of claim 1, wherein the transparent conductive film is formed outermost to the common electrode.

10. The device of claim 1, wherein the transparent conductive film extends toward the data electrode.

11. A method for manufacturing an in-plane switching mode LCD device having a plurality of pixels comprising:
providing first and second substrates;
forming a plurality of gate lines and common electrodes on the first substrate;
forming a gate insulating film on the common electrodes;
forming a plurality of data lines and data electrodes on the gate insulating film;
forming a transparent conductive film in a layer over the common electrodes, the transparent conductive film electrically connected with the common electrodes; and
forming a liquid crystal layer between the first and second substrates, wherein the data electrodes and the common electrodes generate an in-plane electric field substantially parallel to the first and second substrates for controlling an amount of light at the respective pixel.

12. The method of claim 11, wherein the common electrode is selected from the group of consisting of Al, Cr, Ti and Al alloy.

13. The method of claim 11, further comprising the step of forming a passivation film on the data electrodes.

14. The method of claim 11, wherein the common electrode is electrically connected with the transparent conductive film through a contact hole of the passivation film.

15. The method of claim 11, further comprising the step of electrically connecting the common electrodes with the transparent conductive film.

16. The method of claim 15, wherein the common electrode is electrically connected with the transparent conductive film through a laser welding.

17. The method of claim 11, wherein the transparent conductive film includes indium tin oxide (ITO).

18. The method of claim 11, wherein the liquid crystal layer includes a cyano (CN) based liquid crystal.

19. The method of claim 11, wherein the liquid crystal layer includes a fluorine (F) based liquid crystal.

20. The method of claim 11, wherein the transparent conductive film is formed outmost to the common electrodes.

21. The method of claim 11, wherein the transparent conductive film extends toward at least one of the data electrodes.

* * * * *